United States Patent [19]

Dudzik et al.

[11] Patent Number: 4,658,982

[45] Date of Patent: Apr. 21, 1987

[54] LABELING APPARATUS WITH IMPROVED LABEL TRANSPORT CONTROL

[76] Inventors: Joachim Dudzik, Vor dem Klingler 1, 7440 Nürtingen; Winfried Dudzik, Drosselweg 13, 7441 Neckartailfingen, both of Fed. Rep. of Germany

[21] Appl. No.: 593,042

[22] Filed: Mar. 23, 1984

[30] Foreign Application Priority Data

Mar. 24, 1983 [DE] Fed. Rep. of Germany ....... 3310840

[51] Int. Cl.[4] ........................ G07F 11/00; G07F 11/68; B65H 5/28; B32B 31/00

[52] U.S. Cl. ........................................ 221/13; 221/73; 156/542; 156/DIG. 28; 156/DIG. 33

[58] Field of Search ............... 156/361, 540, 541, 542, 156/DIG. 28, DIG. 33, 475, 480; 242/67.1 R, 67.3 R, 67.5; 221/13, 25, 71, 72, 73

[56] References Cited

U.S. PATENT DOCUMENTS

| | | | |
|---|---|---|---|
| 2,991,950 | 7/1961 | Axoa | 242/67.5 |
| 3,222,004 | 12/1965 | Crowe | 242/67.5 |
| 3,701,493 | 10/1972 | Welsch et al. | 242/67.5 |
| 3,831,883 | 8/1974 | Easterly | 242/67.5 |
| 4,105,166 | 8/1978 | Mackie | 242/67.5 |
| 4,183,779 | 1/1980 | Barber et al. | 156/361 |
| 4,496,417 | 1/1985 | Haake et al. | 156/361 |

FOREIGN PATENT DOCUMENTS 3135654 3/1983 Fed. Rep. of Germany .

*Primary Examiner*—Michael Ball
*Assistant Examiner*—Louis Falasco
*Attorney, Agent, or Firm*—Erwin S. Teltscher; Peter R. Ruzek

[57] ABSTRACT

A band carrying labels is transported step by step from a feed reel over a label removing station to a take-up reel. The drive mechanism consists of a double acting pneumatic cylinder pivotably connected to a frame, movement of the piston rod to effect trransport of the band is initiated by an optical scanner which senses the presence of a properly positioned box to which the label is to be applied. The return movement stopping the band transport is initiated by a band sensing device. The piston rod is coupled to the take-up reel by a rectangular linkage. The linkage causes the take-up reel to be moved with an angular velocity which increases during each transport step in such a way that the final linear velocity of the band at the end of each transport step is substantially independent of the diameter of the coil on the take-up reel.

11 Claims, 3 Drawing Figures

LABELING APPARATUS WITH IMPROVED LABEL TRANSPORT CONTROL

CROSS REFERENCE TO RELATED APPLICATIONS AND PUBLICATIONS

The subject matter of this application is related to that of our copending application entitled "Improved Sensor For Label Transporting Equipment", having a priority based on Fed. Rep. German Application No. P 33 10 839.0 of Mar. 24, 1983, and filed simultaneously herewith.

FIELD OF THE INVENTION

The present invention relates to methods and systems for automatically or semiautomatically applying labels to objects. In particular, the labels are self-adhesive labels which are transported on a band pulled off a supply reel, past a station at which the label is removed and applied to the object, the empty band being wound onto a take-up reel positioned in vicinity of the label removing station. The transport of the band from the supply reel to the take-up reel takes place in a step by step fashion.

BACKGROUND OF THE INVENTION

In labelling equipment described in German published application DE-OS No. 31 35 654, the take-up reel is driven in the above-mentioned step wise fashion by a pneumatic cylinder. The piston rod of the pneumatic cylinder is directly linked to a crank or rocker arm, which is coupled to the axle of the take-up reel through a freewheel. Since the piston drive takes place at a constant velocity, the final linear velocity of the band at the end of each step will increase with increasing diameter of the coil accumulated on the take-up reel. Since the system has an associated inertia, the distances required to stop the band will vary as a function of the diameter of the coil on the take-up reel. This makes it impossible to apply the labels exactly to the object to be labelled.

SUMMARY OF THE INVENTION

It is an object of the present invention to furnish a method and apparatus to eliminate the above-described difficulties. Specifically, the system of the present invention is designed to allow the stopping of the band to take place within a predetermined distance following receipt of the stop signal, independent of the diameter of the coil on the take-up reel.

According to the present invention, a band carrying a series of labels is pulled from a supply reel past a label removing station. The resulting empty band is wound step by step onto a take-up reel thereby creating a coil of increasing diameter. However, the take-up reel is driven with an angular velocity which increases during each of the steps so that the final linear velocity of the band at the end of each of the steps is substantially independent of the diameter of the coil. For the same end velocity, the distance required to stop the tape will always be the same.

For exact labeling, the band carrying the labels should be advanced by exactly the length of a label during each step. If the band transport is carried out at a relatively low velocity for which the band can be stopped approximately instantaneously, there is no problem. Problems arise only at the higher band transport speeds, at which the distance required to stop the tape becomes appreciable and, in addition, because of the variations of diameter of the take-up reel, the actual transport velocities will vary. It is thus the basic idea of the present invention, that compensation for the variations in band velocity due to changes in the diameter of the coil in the take-up reel will result in an equalization of the end velocity at each step and therefore an equalization of the distance required to stop the tape. According to the invention, this equalization is achieved by, as mentioned above, driving the take-up reel so that its angular speed increases throughout the angle covered by each step. Since the angles covered by each step decrease with increasing coil diameter, the linear velocity of the band at the end of each step will be approximately the same, allowing it to be stopped in about the same distance.

A preferred driving mechanism for implementing the invention consists of a pneumatic cylinder whose piston rod advances at a constant speed. The piston rod is coupled to one end of the crossbar of a T shaped rocker the base of whose stem is pivotably connected to the frame. The other end of the crossbar is connected through a connecting rod to a rocker arm coupled to the take-up shaft or axle by a freewheel. Proper dimensioning of this drive mechanism allows the linear velocity of the band at the end of each step to be the same, independent of the diameter of the coil on the take-up reel.

The novel features which are considered as characteristic of the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENT

Figure 1:
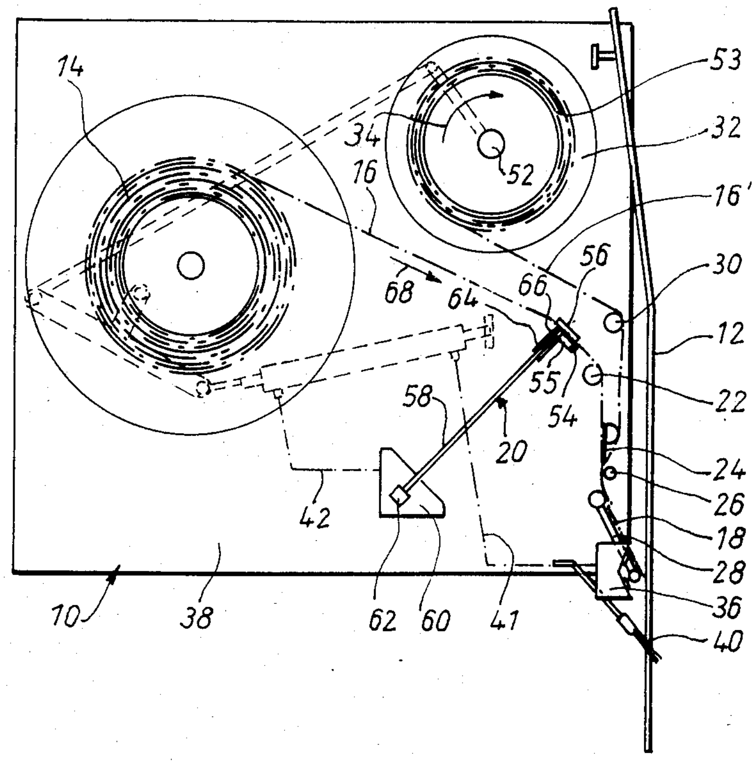
FIG. 1 is a top view of a labeling device.

The labeling equipment illustrated in FIG. 1 may be used, for example, for automatically applying self-adhesive labels to block-and-tackle boxes transported past the device on one side of a guide rod 12.

Figure 2:
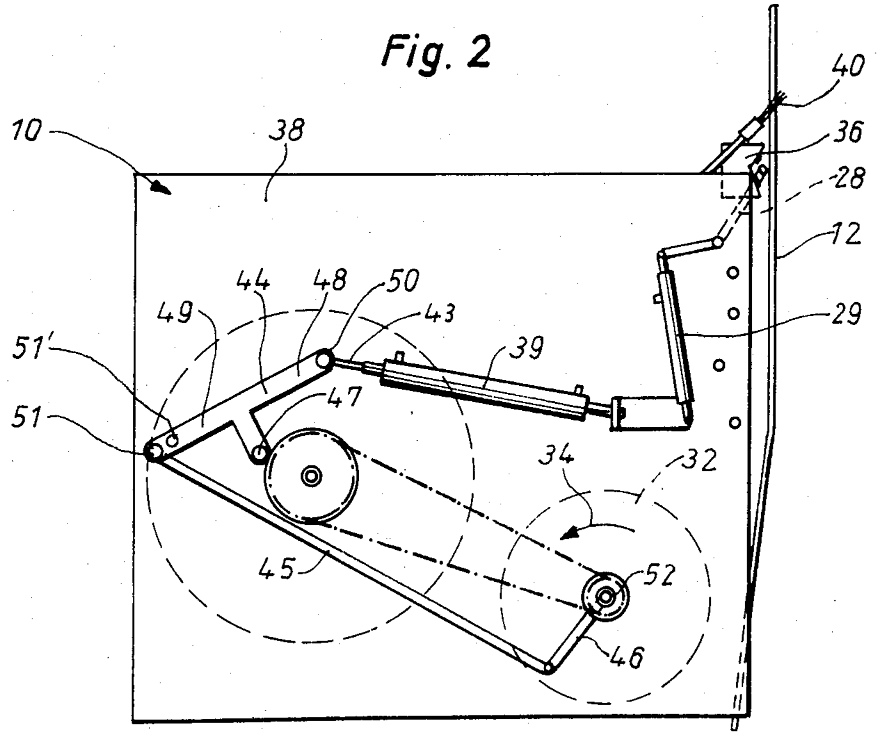
FIG. 2 is a view from the bottom of the labeling device of FIG. 1.
Figure 3:
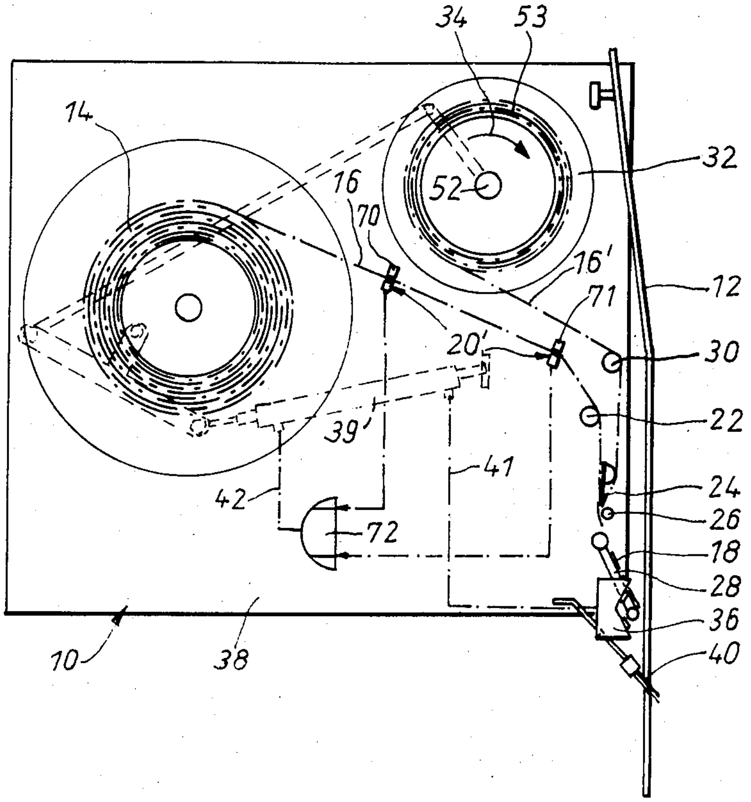
FIG. 3 is a top view of an alternate embodiment of a labeling device.

The band 16 is pulled from the supply reel 14 and carries self-adhesive labels at predetermined distances from one another on the side facing downward in FIGS. 1 and 3. The band is transported past a scanning device 20 or 20' and a guide roller 22 to a label removing station. This consists of a sharp edge 24 at which the direction of advance of the band is changed so that the first label 18 is removed from the band and pushed forwards under a roller 26 onto a flap 28, while the empty band 16' is directed towards a take-up reel 32 by means of a second guide roller 30. The take-up reel is driven in a stepwise manner in the direction of arrow 34 by the mechanism illustrated in FIG. 2.

Application of the label to the box and the subsequent step of band transport is initiated by the output signal of an optical scanner 36. Scanner 36 recognizes markings on the box and furnishes information according thereto to a central control (not illustrated). During labeling, flap 28 with self-adhesive label 18 is pushed against the side of the passing box by means of a pneumatic cylinder 29. The box then passes a brush 40 which causes the label, which is already sticking at its front edge, to be firmly affixed to the wall of the box throughout its length. During, or immediately after this labeling process, the next transport step is initiated through the central control, causing the next self-adhesive label 18 to arrive at edge 24. Thereafter, the signal from scanner 20, 20' causes the band transport to be stopped again, after the band has been transported by a length equal to that of one label.

The drive mechanism illustrated in FIG. 2 includes a double acting pneumatic cylinder 29 hinged at one end. Pneumatic cylinder 29 has a rod shaped end (right side in FIG. 2) hinged to a plate fastened to frame 38. As illustrated symbolically by the dot dash lines 41, 42, the driving movement of cylinder 39 is initiated by optical scanner 36, while the return movement is initiated by a signal from the band scanning device 20. Piston rod 43 of the pneumatic cylinder is connected to the take-up coil 32 by means of a rectangular linkage consisting of a T shaped rocker 44, a connecting rod 45 and rocker arm 46. T shaped rocker 44 pivots with a fulcrum thereof about an axis 47 fixed with respect to frame 38. One side 48 of the crossbar of the T is pivotably linked to piston rod 43, while the other side is similarly linked to connecting rod 45. The axes 47, 50 and 51 of rocker 44 form a rigid triangle which is pivoted about axis 47, the latter being positioned on the side of rocker 44 facing rocker arm 46.

Rocker arm 46 is connected to axle 52 through a freewheel (not shown). Take-up coil 32 is mounted on axle 52 via a pawl stop acting in the opposite sense to the above-mentioned freewheel and, preferably also constituted as a freewheel. Thus rocker arm 46 and, for an engaged freewheel, take-up coil 32 are driven in the angular direction indicated by arrow 34 upon movement of piston rod 43 in the transport direction (first direction). When piston rod 43 is pulled back causing a return movement of rocker arm 46, the pawl stop causes axle 52 and take-up coil 32 to remain stationary, so that the empty band 16' is not pulled off the take-up coil. For this purpose reel 53 must be fastened to take-up coil 32 in a manner preventing relative rotation therebetween.

Since band 16 is advanced by the length of one label after each labeling process, an increase in the diameter of take-up coil 32 results in a decrease of the angle through which it rotates and a decrease in the length of movement of piston rod 43, while the median velocity with which the band is pulled off the supply reel increases. Rectangular linkage 44, 45, and 46 causes take-up coil 32 to be driven with increasing angular velocity during each transport step in such a way that band 16, 16' reaches take-up coil 32 with a final linear velocity which remains the same, independent of the diameter of the take-up coil. This causes the distance required to stop the band to be the same, also independent of the take-up coil diameter. As mentioned before, this is particularly necessary during the higher speeds of band advancement for which it is impossible to stop the band instantaneously.

The embodiments illustrated in FIGS. 1, 2 and 3 are drawn to a scale of about 1:100, the dimensions of the base plate being 90×105 CM. The angle A traversed by rocker arm 46 is given by the following equation:

$$A=(360/3.14)\times(L/D)$$

where L is the length of the label and D the diameter of coil 32. For example, for a length of label of 8 centimeters, and a minimum coil diameter of 20 centimeters, rocker arm will traverse an angle of 45.8 degrees. When the diameter of the coil has reached 30 centimeters, rocker arm 46 will traverse an angle of 30.5 degrees. To accomodate different label lengths, a number of openings 51, 51' may be provided in side of rocker 44 for pinning of connecting rod 45.

For the embodiment illustrated in FIG. 1, band transport is stopped by a signal from band scanning device 20 which responds to the space between two labels on the band. Scanning device 20 consists of an angle lever having an arm 55 pivoting about an axis 54 and a second arm perpendicularly to arm 55. A feeler roller is eccentrically arranged on lever arm 55 and is pressed against the surface of the band carrying the labels by means of a strong flat spring. A supporting plate 56 for the band is provided on the side opposite the roller. In addition, a long flat bar 58 is connected to angle lever 55 so that it will pivot about an axis 60 parallel to axis 54. Specifically, one end of flat bar 58 extends over the perpendicularly extending arm of angle lever 55 and while its opposite free end rests on a flat table 60 and controls the passage of air through an air barrier 62.

The contacting surface in the region of the perpendicularly extending arm of angle lever 55 is limited on one side by a stop 64 and on the opposite side by a flat spring 66 fastened near the axis.

As long as the band is not moving, the feeler roller associated with angle lever 54 is pressed against the surface of the label which is present in this position. The end of flat bar 8 on table 60 closes barrier 62 and prevents the passage of air from the transmitting to the receiving nozzle. As the band starts to move in the direction of arrow 68, this position will remain unchanged as long as the feeler roller still abuts the label.

However, as soon as the trailing edge of the label has been moved past the roller, the latter is pushed by the strong flat spring into the gap between the labels. Simultaneously, angle lever 55 rotates. During this rotation, bar 58 is carried along by stop 64 and is accelerated to the angular velocity of the angle lever. Because of inertia, the rotation of the bar continues in the same direction for a predetermined angle against the opposition of the force of the weak flat spring 66 after the rotation of angle lever 55 has first been stopped and then reversed, as the feeler roller has moved into the gap between the labels and then onto the next label, respectively. Only after this additional rotation is bar 20 returned to stop 64 on angle lever 55 by the force of spring 66. The time in which air can pass through barrier 62 is thus increased many-fold over the time that the feeler roller is in the gap between two labels. Reliable activation of air barrier 62 can thus be assured even for high band transport velocities and small distances between labels by choice of the proper spring constant for the weak flat spring. Unfortunately, at high band velocities, the delayed response of air barrier 62 causes the band to be stopped only when the label following the sensed gap already has passed partly under the feeler roller. The distance the label has travelled can, however, be kept substantially independent of the diameter of takeup coil 32 by use of the rectangular linkage 44, 45 and 46 described above.

In the embodiment illustrated in FIG. 3, the scanning apparatus 20' consists of two scanners 70 and 71, which respond to holes in the band 16. These control holes are arranged on the band at distances corresponding to the distance between labels, the two barriers being arranged on frame 38 at the same distances or integral multiples thereof. During the manufacture of the bands with the labels, it often occurs that individual control holes are not totally punched through and are therefore not sensed properly. Use of two sensors at a distance from one another and an OR gate furnishing a signal controlling pneumatic cylinder 39 in response to a signal from either one of the sensors thus greatly improves the reliability of operation of the device.

While the invention has been illustrated in preferred embodiments, it is not to be limited to the structures shown, since many variations thereof will be evident to one skilled in the art and are intended to be enclopassed in the present invention as set forth in the following claims.

We claim:

1. Apparatus for pulling a band carrying a series of labels from a supply reel, past a label-removing station, thereby creating an empty band and winding said empty band step by step onto a take-up reel so as to create a coil of increasing diameter, said band having a final linear velocity at the end of each of said steps, comprising in combination driving means for driving said take-up reel with an angular velocity increasing during each of said steps so that said final linear velocity of said band at the end of each of said steps in substantially independent of said diameter of said coil, said driving means including a take-up axle carrying said take-up reel, said take-up direction control means coupled to said take-up reel, and permitting rotation in a first direction, and blocking rotation in a second direction opposite said first direction, a first rocker arm, free-wheel means intercoupled between said first rocker arm and said take-up axle, pneumatic cylinder means having a piston rod moving alternately in winding direction and in a return direction, a frame, and linking means for linking said piston rod to said first rocker arm so that said first rocker arm rotates with an increasing angular velocity while said piston rod moves at a predetermined constant speed in said winding direction, said linking means including a second rocker arm having a fulcrum fastened to said frame, and connecting means connecting said second rocker arm to said piston rod and to said first rocker arm.

2. Apparatus as set forth in claim 1, wherein said second rocker is T shaped having a stem and a crossbar;

wherein said fulcrum is in said stem, and wherein said crossbar has a first side linked to said piston rod and a second side, asid linking means further comprising a connecting rod linked to said second side and connected to said rocker arm.

3. Apparatus as set forth in claim 2, wherein said labels have a first or second length extending in the direction of transport of said band; and wherein the location of linking of said connecting rod to said second side of said T shaped rocker crossbar is dependent on said length of said labels.

4. Apparatus as set forth in claim 3, wherein said fulcrum is located between said crossbar and said rocker arm.

5. Apparatus as set forth in claim 1, wherein said band carrying said series of labels is pulled along a predetermined path from said supply reel to said label removing station;

further comprising scanning means located along said predetermined path for generating a stop signal when said band is in a predetermined position relative thereto; and wherein said final linear velocity of said band moving past said scanning means at the end of each of said steps is substantially equal to said final linear velocity at the end the others of said steps.

6. Apparatus as set forth in claim 5, wherein each of said labels has a predetermined length: and wherein said scanning means comprises a first and second scanner spaced from each other at a distance corresponding to a multiple of said length of said labels;

further comprising OR gate means connected to said first and second scanner for generating said stop signal in response to a signal from one or the other of said scanners.

7. Apparatus as set forth in claim 5, wherein said driving means comprises a pneumatic cylinder having a piston rod traveling in a first direction for transport of said band and in a second direction following the end of each of said steps; and wherein said band has control holes and said scanning means comprises a air cell activated in response to sensing of said control holes.

8. Apparatus as set forth in claim 5, wherein said labels are self-adhesive labels having trailing edges;

wherein said band has a first side carrying said self-adhesive labels and a second side;

further comprising backing means arranged along said second side; and wherein said scanning means comprises a mechanical scanning element moving from a rest to an activating position in response to sensing of said edges and having a predetermined response time, air cell means coupled to said mechanical element for generating said stop signal thereby activating said pneumatic cylinder to stop said transport of said tape when said mechanical scanning element is in said activating position, and delay means for maintaining said mechanical scanning element in said activating position following said predetermined response time.

9. Apparatus as set forth in claim 8, wherein said delay means comprises a spring.

10. Apparatus as set forth in claim 8, further comprising a stop connected to said mechanical scanning element, an activating bar intercoupled between said air cell means and said mechanical scanning element; and wherein said activating bar abuts said stop and is carried with said mechanical scanning element when said mechanical scanning element moves from said rest to said activating position.

11. Apparatus as set forth in claim 10, further comprising a weak spring for returning said scanning element and said activating bar to said rest position.

* * * * *